Aug. 29, 1972  HEINZ-GERD REINKEMEYER  3,687,766
PROCESS AND APPARATUS FOR MANUFACTURING HIGH-FREQUENCY
WELDED UPHOLSTERY ARTICLES
Filed Dec. 30, 1968

INVENTOR
HEINZ-GERD REINKEMAYER

BY *Craig & Antonelli*

ATTORNEYS

United States Patent Office 3,687,766
Patented Aug. 29, 1972

3,687,766
PROCESS AND APPARATUS FOR MANUFACTURING HIGH-FREQUENCY WELDED UPHOLSTERY ARTICLES
Heinz-Gerd Reinkemeyer, Beuthenerstrasse 12, Oberlar, Germany
Filed Dec. 30, 1968, Ser. No. 787,986
Int. Cl. B32b 5/18
U.S. Cl. 156—209                    2 Claims

ABSTRACT OF THE DISCLOSURE

A process and apparatus for producing upholstery having a rolled or quilted appearance by the formation of a plurality of spaced welded seams, wherein the upholstery, including a backing material, a resilient lining material and a surface material, is welded, by means of high-frequency welding, along spaced, substantially-parallel lines between a plate-shaped electrode and a plurality of bar-shaped electrodes and wherein a plurality of rods of predetermined cross-sectional configuration are disposed, between the resilient lining material and the surface material, prior to welding, at least one of the rods being positioned between each adjacent pair of bar-shaped electrodes and extending substantially parallel thereto.

BACKGROUND OF THE INVENTION

In a number of industries, for example, the furniture manufacturing industry and, more specifically, in the manufacture of upholstery for automotive applications, conventional sewing processes are being replaced by high-frequency welding processes for bonding together the surface and backing materials, and particularly wherein a resilient lining material is to be interposed between the first-mentioned components. The ever-increasing use of synthetic materials, such as polyvinylchloride and other synthetic resins, which are readily adaptable to the high-frequency welding techniques, portends ever-greater importance for such techniques in the future.

The use of rolled, pleated or other forms of profiled-surface upholstery currently enjoys great favor among designers, particularly for use in automotive interiors. High-frequency welding techniques have been employed in the production of such upholstery, whereby the welded seams are located so as to divide the otherwise smooth surface fabrics into aesthetically-pleasing arrangements of small portions. Frequently, the surface or covering materials employed are artificial leather, artificial foam leather or other synthetic fabrics. A resilient lining material commonly utilized for, among other reasons, its amenability to high-frequency welding techniques, is polyvinylchloride foam. A backing material typically employed is a cotton-nettle cloth.

Generally, the upholstery is designed such that the welded seams are arranged, in parallel relationship, at regularly-spaced intervals. Such upholstery is conventionally produced by placing, successively, the backing layer, the resilient lining material and the surface material upon a plate-like surface, which constitutes a planar counter-electrode. The opposite electrode is commonly provided in the form of a plurality of brass bars mounted upon a supporting plate in an arrangement corresponding to the desired pattern of depressions in the upholstery to be produced. The supporting plate, with the brass bar-electrodes mounted thereon, is itself mounted within a press which is adapted to impress the bar-shaped electrodes into the surface material and other upholstery components positioned therebelow upon the counter-electrode. High-frequency voltage is then applied across the electrodes whereby the counter-electrode is heated and the three upholstery components are bonded together by welding under the pressure exerted by the press.

Because a plurality of parallel bar members are simultaneously impressed upon the surface material such as artificial leather or the like, depressing the surface material into the resilient lining material, the covering or surface material is stretched in the regions between the bars and expands to an extent depending upon the elasticity of the particular material employed. After termination of the welding step, the pressure exerted by the press is relieved and the surface material contracts, the extent of the contraction again depending upon the elasticity of the material. Upon contraction of the surface material after it has been bonded to the backing material, a corresponding stretching of the backing material occurs. The complex pattern of surface tension in the various components of the upholstery causes the welded seam to be located approximately midway between the plane originally defined by the backing material and the plane originally defined by the surface material. The pattern of tensile stresses additionally causes a compression of the resilient lining material such that the resulting upholstery may exhibit a thickness of only half the original thickness of the components. Finally, the surface material as well as the backing material of the completed upholstery are subjected to a constant prestress, thereby impairing the physical properties of the upholstery as well as the appearance thereof.

Accordingly, it is an object of the present invention to provide a high-frequency welding process of the type described hereinabove, wherein the harmful effects of the stress pattern created by the welding process are effectively and substantially diminished, such that the finished product does not exhibit a noticeable permanent influence of the stress pattern.

Further, it is an object of the present invention to provide a process of the type described hereinabove whereby the finished product does not exhibit undue compression of the resilient lining material and wherein the welded seams are located substantially coplanar with the original plane of the backing material.

Finally, it is an object of the present invention to provide apparatus capable of performing the improved process contemplated by the present invention.

SUMMARY OF THE INVENTION

The foregoing objects are accomplished, in accordance with the present invention, by positioning at least one rod-like member, prior to welding, between the resilient lining material and the surface material, in the region between each adjacent pair of bar electrodes, the rod-like members extending in substantially parallel relationship with the bar electrodes. The rods, which are constructed from a material which is electrically non-conductive so as to remain relatively cool in the effect of the high-frequency electric field, is dimensioned according to the spacing between adjacent welded seams and the thickness of the resilient lining layer of material. After the welded seams have been formed, the rods are removed by withdrawal in the direction of their longitudinal axis.

The process contemplated by the present invention is particularly advantageous in that it may be performed by apparatus currently in use for manufacturing high-frequency welded upholstery articles, without requiring any substantial alterations to the apparatus. The introduction of the rods prior to welding and the removal thereof after welding merely require additional process steps which can be incorporated within the existing process without difficulty and which can, if necessary be performed in a purely mechanical manner by means of additionally-installed devices.

For maximum economy, the novel concept contemplated by the present invention can be implemented by providing a plurality of appropriately-dimensioned rods spaced, in parallel relationship, at predetermined distances, and supported at one end thereof upon a common cross member which can itself be provided with suitable means for handling.

BRIEF DESCRIPTION OF THE DRAWINGS

The foregoing objects, features and advantages of the present invention will become more readily apparent from a consideration of the detailed description hereinbelow in conjunction with the accompanying drawings, wherein.

DETAILED DESCRIPTION OF THE DRAWINGS

Figure 1:
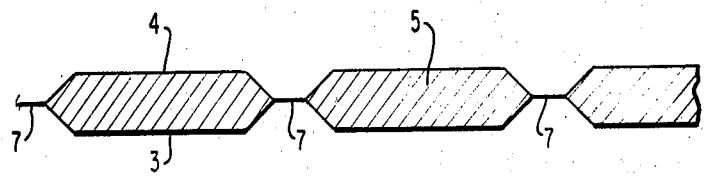
FIG. 1 represents a high-frequency welded article of upholstery as produced according to the conventional processes.

An article of upholstery as produced according to conventional welding processes, as illustrated in FIG. 1, is subdivided, into individual sections, by a plurality of parallel welded seams 7. Each of the individual sections between adjacent seams may have a width, for example, on the order of 50 mm. Due to the stretching of the backing material 3 to compensate for the contraction of the surface material 4 shortly after the formation of the welded seams 7, as discussed above, it can be seen that the welded seams 7 in the finished product produced by conventional techniques are positioned approximately midway between the original plane of the backing material 3 and that of the surface material 4, when viewed in cross-section. Thus, in addition to the actual compression of lining material 5, which produces a decrease in the thickness of the upholstered article, an even more significant and noticeable apparent decrease in thickness is created by the displacement of welded seams 7 from the original plane of backing material 3 to their actual location. This apparent decrease is particularly significant since the finished article, viewed from the direction of surface material 4, appears to a viewer to extend only to the depth of welded seams 7. Since a viewer naturally assumes that the welded seams 7 are formed coplanar with the backing material, the upholstered article appears to have only about half of its actual thickness.

Figure 2:
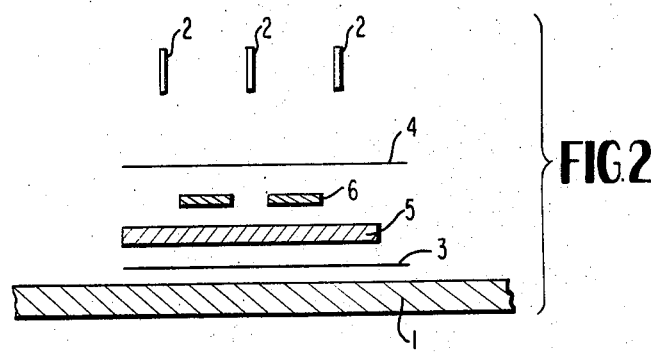
FIG. 2 represents a schematic view of the apparatus and component parts of upholstery, in accordance with the process of the present invention, prior to welding.

In FIG. 2, a diagrammatic representation of the apparatus and the component parts of the upholstery to be formed, in accordance with the present invention, is provided. A counter-electrode 1, constructed in the form of a plate-like member, serves as a support for the component parts of the upholstery to be formed. Upon counter-electrode 1, are placed, in succession, backing material 3, a layer 5 of resilient lining material, which may be, for example, polyvinylchloride foam having a thickness of about 5 mm. After resilient lining material 5 has been positioned upon backing material 3, rods 6 are positioned upon the surface of resilient lining material 5, arranged so as to extend substantially parallel to bar electrodes 2 in positions between the locations of the seams to be formed. Finally, the layer of resilient lining material 5 and the bars 6 disposed thereon are covered by surface material 4.

As the welding proceeds, bar electrodes 2 are advanced in the direction of counter-electrode 1 and pressed thereagainst, thereby compressing between electrodes 1 and 2 the component materials 3, 4 and 5. The rods 6 positioned between the resilient lining material 5 and the surface material 4, which are preferably constructed from an electrically non-conductive material such as, for example, polyethylene, polypropylene or other polyolefin, thereby precluding fusion of the rods 6 with the other materials in the presence of the high-frequency voltage field, serve to increase the thickness of resilient lining material 5 as bar electrodes 2 are pressed against electrode 1. This intentional increase in the thickness of resilient lining material 5 causes an attendant increase in the amount of surface materal 4 between adjacent bar electrodes 2 as electrodes 1 and 2 are pressed together.

Figure 3:
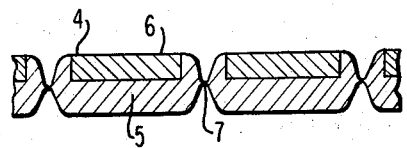
FIG. 3 represents an article of upholstery as produced by he process according to the present invention after the welded seams have been formed.
Figure 4:
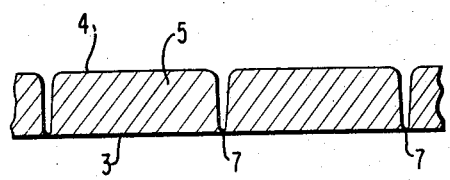
FIG. 4 represents the article of upholstery according to FIG. 3 after completion.

FIG. 3 represents the upholstered article with the welded seams 7 formed and rods 6 still in place between resilient lining material 5 and surface material 4. It can be noted that the external configuration of the upholstered article as illustrated in FIG. 3 corresponds approximately to the finished upholstered article produced by conventional techniques, as represented by FIG. 1. At this point, however, in accordance with the present invention, rods 6 are removed from the individual sections between welded seams 7 by the withdrawal thereof in the direction of their longitudinal axis. After rods 6 have been withdrawn, the upholstered article produced in accordance with the present invention assumes the configuration represented in FIG. 4. In contrast to the configuration of FIG. 1, it should be noted that the configuration of the article represented in FIG. 4 is such that the backing material 3 defines a nearly planar surface. Thus, the entire profile of the finished upholstered article according to FIG. 4 is traced by the configuration of surface material 4. Further, the removal of rods 6 effectively relieves stresss formed within resilient lining material 5.

The appropriate dimensioning of rods 6 depends upon a number of factors, such as, for example, the spacing between adjacent welded seams 7, the thickness of the layer of rsilient lining material 5, the elasticity of the surface material 4 and that of the backing material 3 and the pressure of the welding press employed. As an illustration of how the appropriate dimensions for rods 6 may be determined, however, the following example is set forth:

A rolled upholstered article is to be formed utilizing a surface material of an artificial leather on fabric in a twill bond, a resilient lining material consisting of a polyvinylchloride foam material having a thickness of 5 mm. and a backing material of cotton-nettle cloth. The welding process is to be performed with bar electrodes each having a width of 2 mm. If individual sections between adjacent welded seams are to have a width of 40 mm., an allowance of about 6 mm. in the surface material is preferable. The cross-section of the rods to be inserted should correspond approximately to half of the cross-section of the individual sections between adjacent welded seams. To facilitate removal of the rods after the formation of the welded seams, however, it has been found advantageous to limit the width of the rods to about half of the width of the individual sections. Thus, the optimal dimensions of the rods utilized in the present case would be about 18 mm. x 5 mm.

Because of the extended nature of the articles generally produced, it is often advantageous to produce a plurality of parallel welded seams in a single operating step. Under such circumstances, the positioning and removal of rods 6 can be facilitated by attaching a plurality of rods 6, at one end thereof, to a common cross member such that the rods 6 extend, in parallel relationship, at a spacing corresponding to that between adjacent bar electrodes 2. The resulting structure resembles somewhat a comb having long teeth formed by the individual rods 6. In order to further facilitate handling of the cross member, it may be provided with a handle or recesses so that it may be readily gripped when it is desired to either position the rods 6 or to withdraw same after welding. Additionally, individual rods 6 can be provided with cross-bores near the free ends thereof, which cross-bores extend substantially perpendicular to the plane of counter-electrode 1. Accordingly, a plurality of pins may be provided upon the surface of counter-electrode 1 positioned so as to fit within the cross-bores in the individual rods 6, thereby facilitating accurate positioning of rods 6 within the welding press.

While the process and apparatus contemplated by the present invention has been described with specific reference to but a few embodiments thereof, it is to be understood that the scope of the present invention is not limited to the specific details of these illustrative embodiments, but is susceptible of numerous changes and modifications as would be apparent to one with normal skill in the pertinent technology.

What is claimed is:

1. A process for the manufacture of upholstered articles subdivided, by means of seams, into a plurality of individual sections, comprising the steps of:

disposing a layer of a backing material upon a substantially planar counter-electrode surface, disposing a layer of a resilient lining material upon said layer of a backing material, disposing at least one rod of an electrically non-conductive material upon said layer of resilient lining material, positioned thereon between two adjacent locations where seams are to be formed, disposing a layer of a surface material upon said layer of resilient lining material with said rods disposed thereon, pressing at least two bar-shaped electrodes against the upper surface of said layer of surface material in the direction of said planar electrode surface while applying a high-frequency voltage to said electrodes to effect bonding of the component materials along locations corresponding to the locations of the bar-shaped electrodes, and removing each of said rods from between each adjacent pair of welded seams.

2. A process according to claim 1, wherein said welded seams to be formed are oriented in substantially parallel relationship and said bar-shaped electrodes are arranged accordingly within a press, said rods being also disposed in substantially parallel relationship with said bar-shaped electrodes and with one another.

References Cited

UNITED STATES PATENTS

| | | | |
|---|---|---|---|
| 2,633,442 | 3/1953 | Caldwell | 156—292 |
| 3,244,571 | 4/1966 | Weisman | 156—290 X |

FOREIGN PATENTS

| | | | |
|---|---|---|---|
| 13,527 | 7/1963 | Japan | 156—290 |

CARL D. QUARFORTH, Primary Examiner

E. E. LEHMANN, Assistant Examiner

U.S. Cl. X.R.

156—219, 273, 290, 306; 161—161